(12) United States Patent
Beckman et al.

(10) Patent No.: US 8,473,538 B2
(45) Date of Patent: Jun. 25, 2013

(54) N-DIMENSIONAL COORDINATES CONVERSION

(75) Inventors: Brian C Beckman, Newcastle, WA (US); Henricus Johannes Maria Meijer, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1367 days.

(21) Appl. No.: 11/779,898

(22) Filed: Jul. 19, 2007

(65) Prior Publication Data

US 2009/0024683 A1 Jan. 22, 2009

(51) Int. Cl.
*G06F 7/22* (2006.01)

(52) U.S. Cl.
USPC ........................................................ 708/442

(58) Field of Classification Search
None
See application file for complete search history.

(56) References Cited

U.S. PATENT DOCUMENTS

| | | | |
|---|---|---|---|
| 5,483,567 A * | 1/1996 | Swerdloff | 378/4 |
| 5,588,097 A | 12/1996 | Ono et al. | |
| 5,793,377 A | 8/1998 | Moore | |
| 6,064,388 A * | 5/2000 | Reyzin | 345/418 |
| 6,791,530 B2 | 9/2004 | Vernier et al. | |
| 6,874,006 B1 * | 3/2005 | Fu et al. | 708/442 |
| 6,894,703 B2 | 5/2005 | Vernier et al. | |
| 6,911,981 B2 | 6/2005 | Thoemmes et al. | |
| 7,271,803 B2 * | 9/2007 | Ejiri et al. | 345/427 |
| 2003/0184763 A1 | 10/2003 | Ueki et al. | |
| 2006/0131489 A1 | 6/2006 | Riepertinger | |
| 2006/0251301 A1 | 11/2006 | McNamara et al. | |

OTHER PUBLICATIONS

Taki, "Matrix Method for Coordinates Transformation", Feb. 29, 2004, pp. 1-73.
Denis, "MP2GL: Prototyping 3D Objects with Metapost and OpenGL", Mar. 7, 2005, pp. 1-26.

* cited by examiner

*Primary Examiner* — David H Malzahn (57) ABSTRACT

Aspects of the subject matter described herein relate to converting between polar and rectangular coordinates. In aspects, the Nth polar angle is measured upward from the sine-projection of the Nth component in the (N–1)th dimension. The last polar coordinate is zero if and only if the corresponding last rectangular coordinate is zero. The conversion may be applied in any number of dimensions without re-writing the conversion logic.

20 Claims, 11 Drawing Sheets

N-DIMENSIONAL COORDINATES CONVERSION

BACKGROUND

Programmers write programs that draw pictures and animate scenes on computer screens. To write these programs, programmers typically use mathematical formulations for computational geometry in two, three, and four dimensions. These mathematical formulations are highly specialized to a particular dimensionality. There is one formulation for two dimensions, another formulation for three dimensions, and yet another formulation for four dimensions. These formulations are based on conventions established during the last three centuries and have been baked into mathematics curricula for generations. Unfortunately, the formulations are error-prone when encoded in computer software and are not extensible to other dimensions.

SUMMARY

Briefly, aspects of the subject matter described herein relate to converting between polar and rectangular coordinates. In aspects, the Nth polar angle is measured upward from the sine-projection of the Nth component in the (N−1)th dimension. The last polar coordinate is zero if and only if the corresponding last rectangular coordinate is zero. The conversion may be applied in any number of dimensions without re-writing the conversion logic.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

BRIEF DESCRIPTION OF THE DRAWINGS

FIGS. 2A-6B are block diagrams generally representing exemplary application programming interfaces that may operate in accordance with aspects of the subject matter described herein;

DETAILED DESCRIPTION

Exemplary Operating Environment

Figure 1:
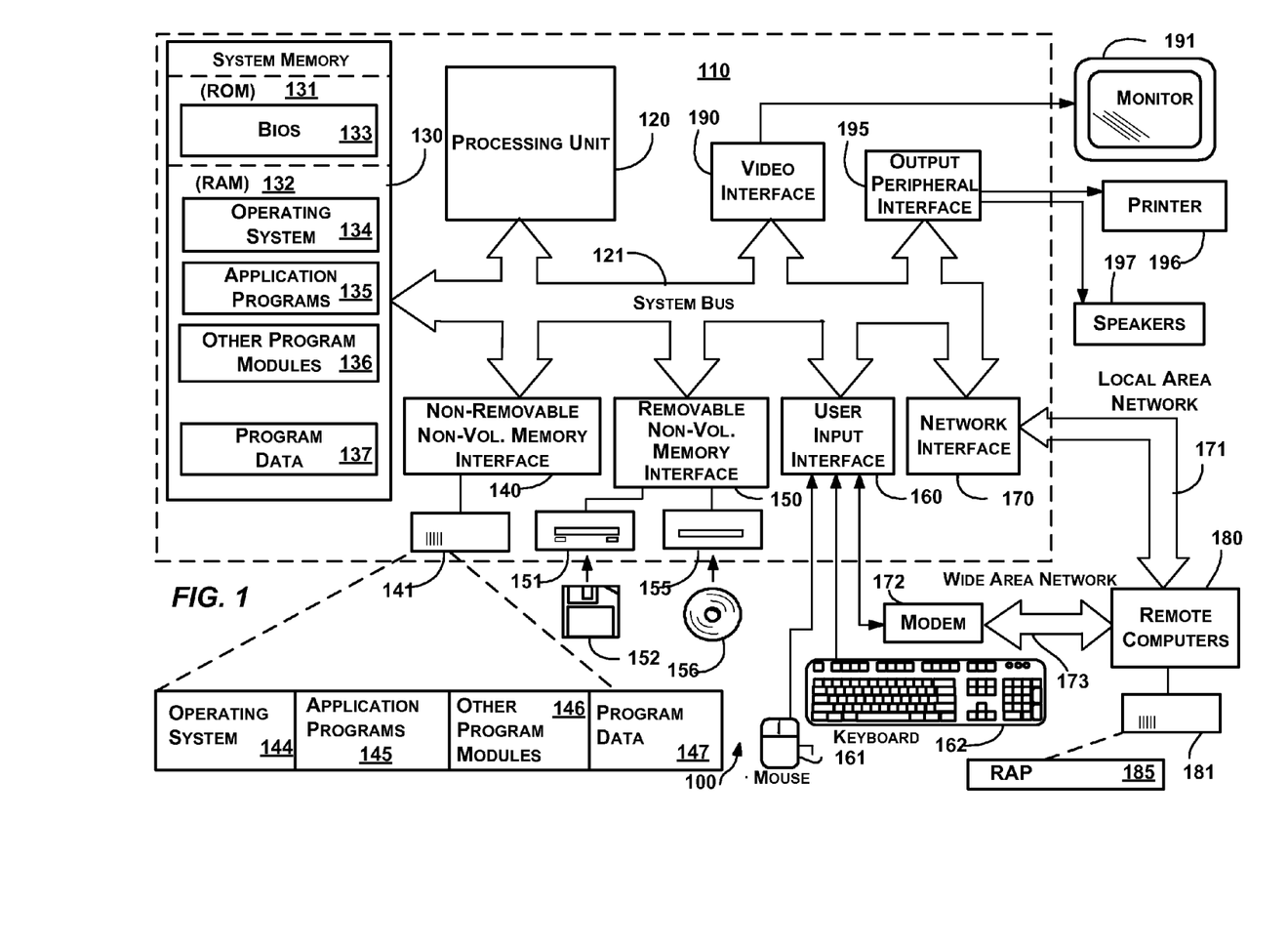
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general-purpose or special-purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set-top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Interfaces

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), and the like of a component of a system capable of communicative coupling to one or more mechanism(s), method(s), function call(s), module(s), and the like of other component(s). The term "segment of code" is intended to include one or more instructions or lines of code, and includes, for example, code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 2A:
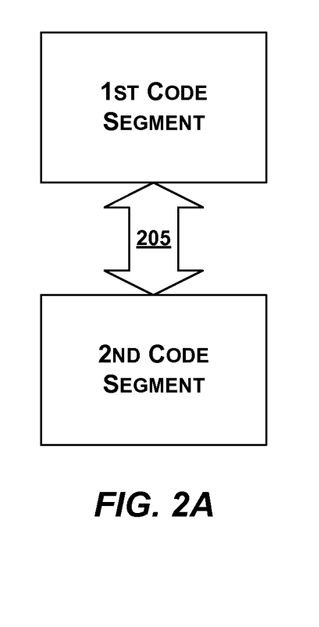
Figure 2B:
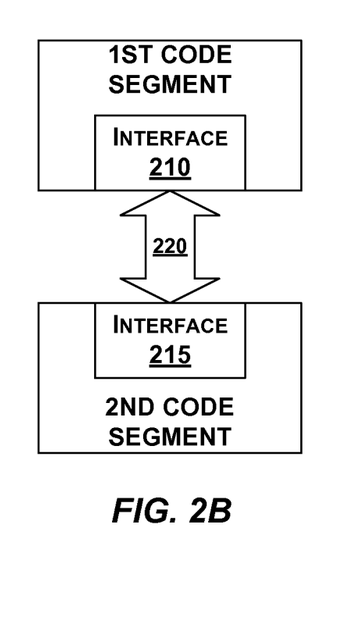

Notionally, a programming interface may be viewed generically, as shown in FIG. 2A or FIG. 2B. FIG. 2A illustrates an interface 205 as a conduit through which first and second code segments communicate. FIG. 2B illustrates an interface as comprising interface objects 210 and 215 (which may or may not be part of the first and second code segments), which enable first and second code segments of a system to communicate via medium 220. In the view of FIG. 2B, one may consider interface objects 210 and 215 as separate interfaces of the same system and one may also consider that objects 210 and 215 plus medium 220 comprise the interface. Although FIGS. 2A and 2B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing, and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g., information placed in a buffer, file, etc. separate from information flow between the code segments) or non-existent, as when one code segment simply accesses functionality performed by a second code segment. Any or all of these aspects may be important in a given situation, for example, depending on whether the code segments are part of a system in a loosely coupled or tightly coupled configuration, and so this list should be considered illustrative and non-limiting.

This notion of a programming interface is known to those skilled in the art and is clear from the foregoing detailed description. There are, however, other ways to implement a programming interface, and, unless expressly excluded, these too are intended to be encompassed by the claims set forth at the end of this specification. Such other ways may appear to be more sophisticated or complex than the simplistic view of FIGS. 2A and 2B, but they nonetheless perform a similar function to accomplish the same overall result. Below are some illustrative alternative implementations of a programming interface.

A. Factoring

Figure 3A:
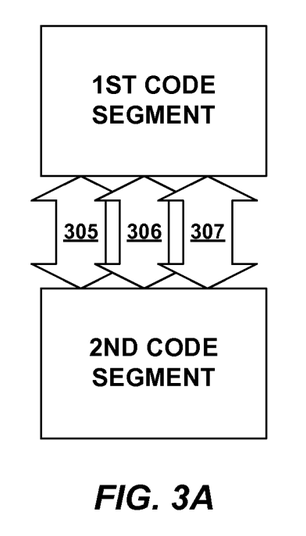

A communication from one code segment to another may be accomplished indirectly by breaking the communication into multiple discrete communications. This is depicted schematically in FIGS. 3A and 3B. As shown, some interfaces can be described in terms of divisible sets of functionality. Thus, the interface functionality of FIGS. 2A and 2B may be factored to achieve the same result, just as one may mathematically provide 24 as 2 times 2 times 3 times 2. Accordingly, as illustrated in FIG. 3A, the function provided by interface 205 may be subdivided to convert the communications of the interface into multiple interfaces 305, 306, 307, and so on while achieving the same result.

Figure 3B:
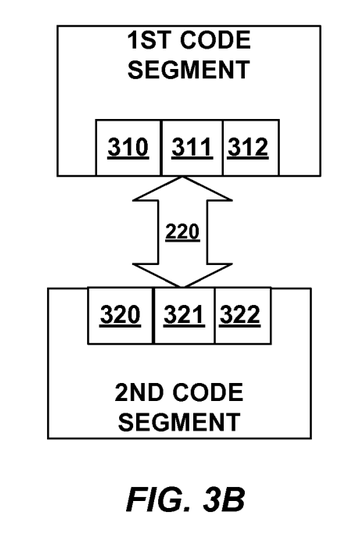

As illustrated in FIG. 3B, the function provided by interface 210 may be subdivided into multiple interfaces 310, 311, 312, and so forth while achieving the same result. Similarly, interface 215 of the second code segment which receives information from the first code segment may be factored into multiple interfaces 320, 321, 322, and so forth. When factoring, the number of interfaces included with the $1^{st}$ code segment need not match the number of interfaces included with the $2^{nd}$ code segment. In either of the cases of FIGS. 3A and 3B, the functional spirit of interfaces 205 and 210 remain the same as with FIGS. 2A and 2B, respectively.

The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 4A:
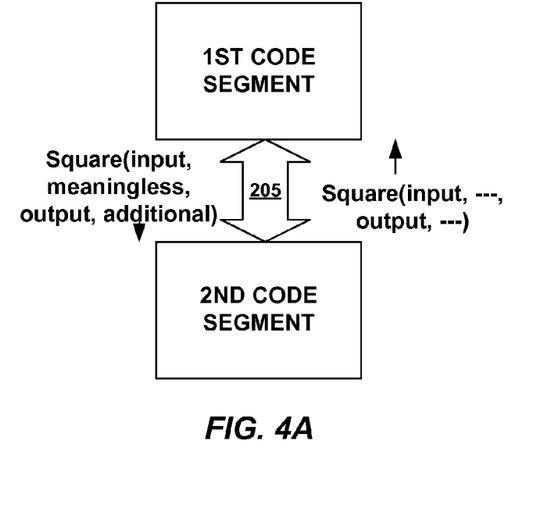
Figure 4B:
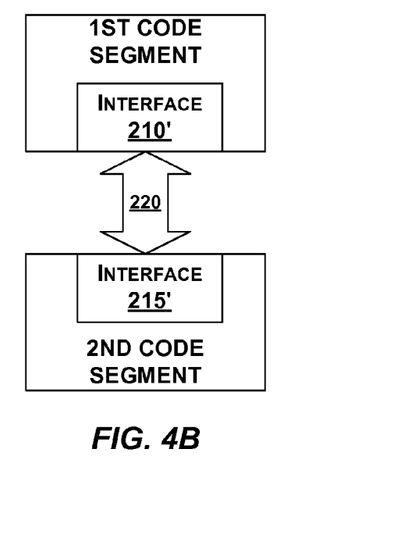

In some cases, it may be possible to ignore, add, or redefine certain aspects (e.g., parameters) of a programming interface while still accomplishing the intended result. This is illustrated in FIGS. 4A and 4B. For example, assume interface 205 of FIG. 2A includes a function call Square(input, precision, output), that includes three parameters, input, precision and output, and which is issued from the $1^{st}$ Code Segment to the $2^{nd}$ Code Segment. If the middle parameter precision is of no concern in a given scenario, as shown in FIG. 4A, it could just as well be ignored or even replaced with a meaningless (in this situation) parameter. An additional parameter of no concern may also be added. In either event, the functionality of square can be achieved, so long as output is returned after input is squared by the second code segment.

Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 4B, interface 210 is replaced by interface 210', redefined to ignore or add parameters to the interface. Interface 215 may similarly be redefined as interface 215', redefined to ignore unnecessary parameters, or parameters that may be processed elsewhere. As can be seen, in some cases a programming interface may include aspects, such as parameters, that are not needed for some purpose, and so they may be ignored or redefined, or processed elsewhere for other purposes.

C. Inline Coding

Figure 5A:
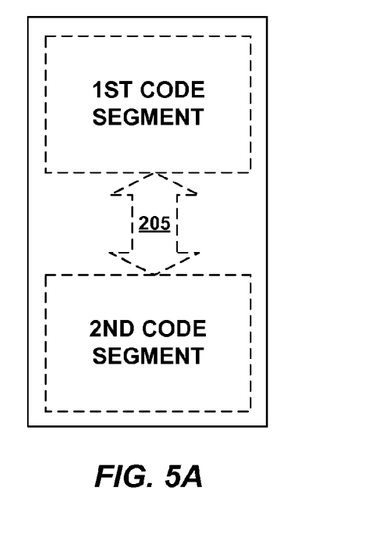
Figure 5B:
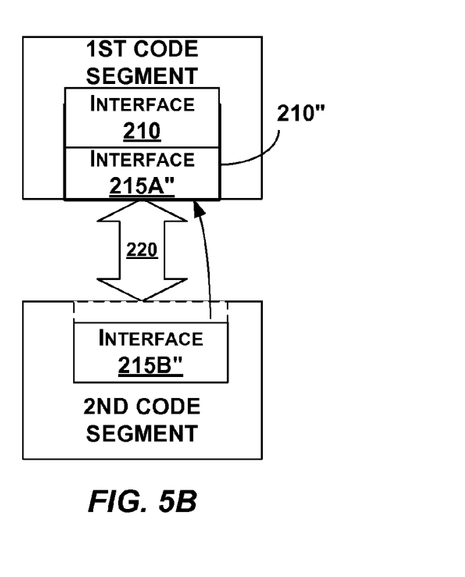

It may also be feasible to merge some or all of the functionality of two separate code modules such that the "interface" between them changes form. For example, the functionality of FIGS. 2A and 2B may be converted to the functionality of FIGS. 5A and 5B, respectively. In FIG. 5A, the previous $1^{st}$ and $2^{nd}$ Code Segments of FIG. 2A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface 205 may still be in effect. Similarly, shown in FIG. 5B, part (or all) of interface 215 from FIG. 2B may be written inline into interface 210 to form interface 210". As illustrated, interface 215 is divided into 215A" and 215B", and interface portion 215A" has been coded in-line with interface 210 to form interface 210".

For a concrete example, consider that the interface 210 from FIG. 2B may perform a function call square (input, output), which is received by interface 215, which after processing the value passed with input (to square it) by the second code segment, passes back the squared result with output. In such a case, the processing performed by the second code segment (squaring input) can be performed by the first code segment without a call to the interface.

D. Divorce

Figure 6A:
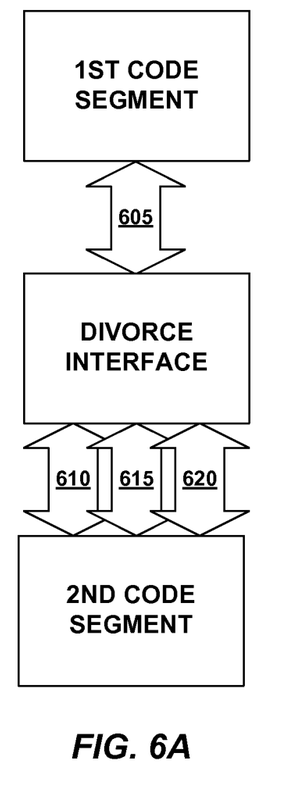

A communication from one code segment to another may be accomplished indirectly by breaking the communication into multiple discrete communications. This is depicted schematically in FIGS. 6A and 6B. As shown in FIG. 6A, one or more piece(s) of middleware (Divorce Interface(s), since they divorce functionality and/or interface functions from the original interface) are provided to convert the communications on the first interface 605, to conform them to a different interface, in this case interfaces 610, 615, and 620. This might be done, for example, where there is an installed base of applications designed to communicate with, say, an operating system in accordance with an first interface 605's protocol, but then the operating system is changed to use a different interface, in this case interfaces 610, 615, and 620. It can be seen that the original interface used by the $2^{nd}$ Code Segment is changed such that it is no longer compatible with the interface used by the $1^{st}$ Code Segment, and so an intermediary is used to make the old and new interfaces compatible.

Figure 6B:
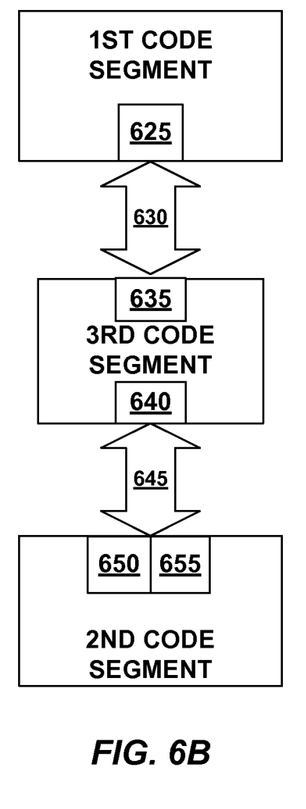

Similarly, as shown in FIG. 6B, a third code segment can be introduced with divorce interface 635 to receive the communications from interface 630 and with divorce interface 640 to transmit the interface functionality to, for example, interfaces 650 and 655, redesigned to work with divorce interface 640, but to provide the same functional result. Similarly, 635 and 640 may work together to translate the functionality of interfaces 210 and 215 of FIG. 2B to a new operating system, while providing the same or similar functional result.

E. Rewriting

Yet another possible variant is to dynamically rewrite the code to replace the interface functionality with something else but which achieves the same overall result. For example, there may be a system in which a code segment presented in an intermediate language (e.g. Microsoft IL, Java® Byte-Code, etc.) is provided to a Just-in-Time (JIT) compiler or interpreter in an execution environment (such as that provided by the .Net framework, the Java® runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 7 and 8.

Figure 7:
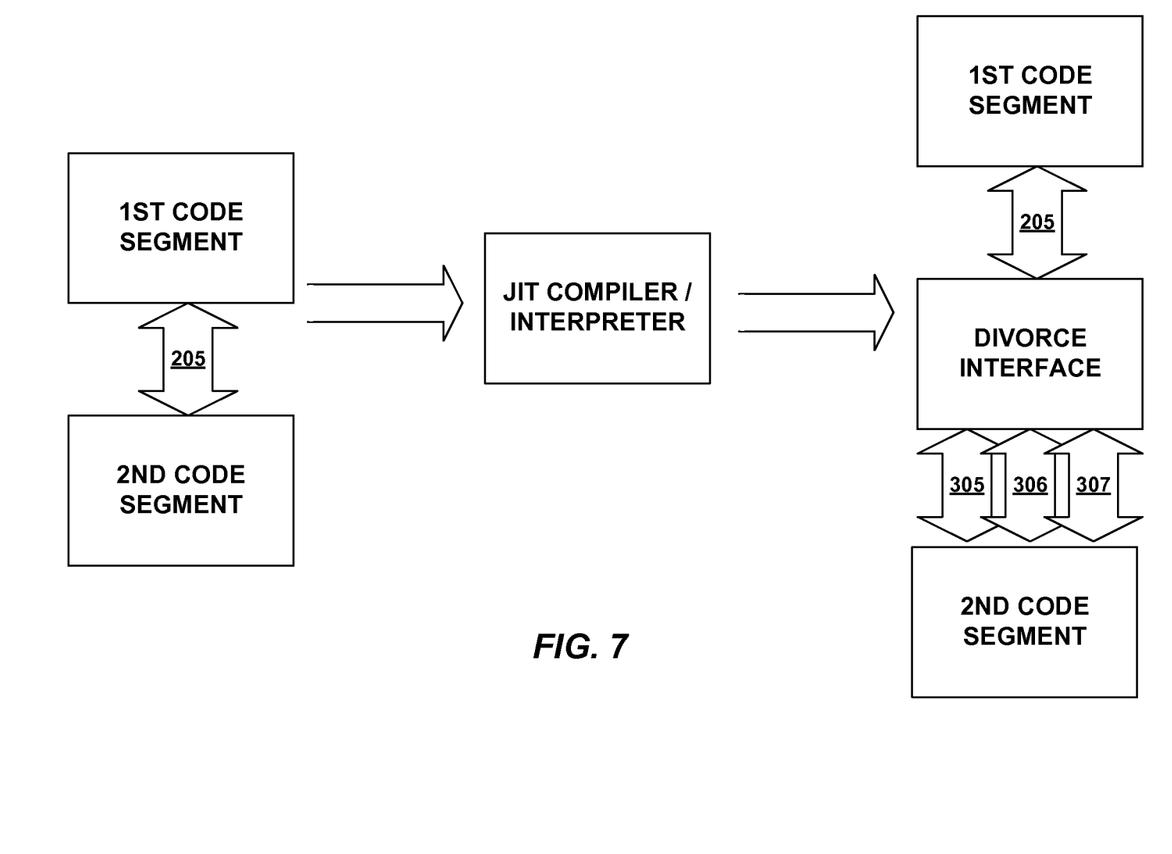
FIGS. 7 and 8 are block diagrams that generally represent how a compiler or interpreter may transform one or more interfaces to one or more other interfaces in accordance with aspects of the subject matter described herein.
Figure 8:
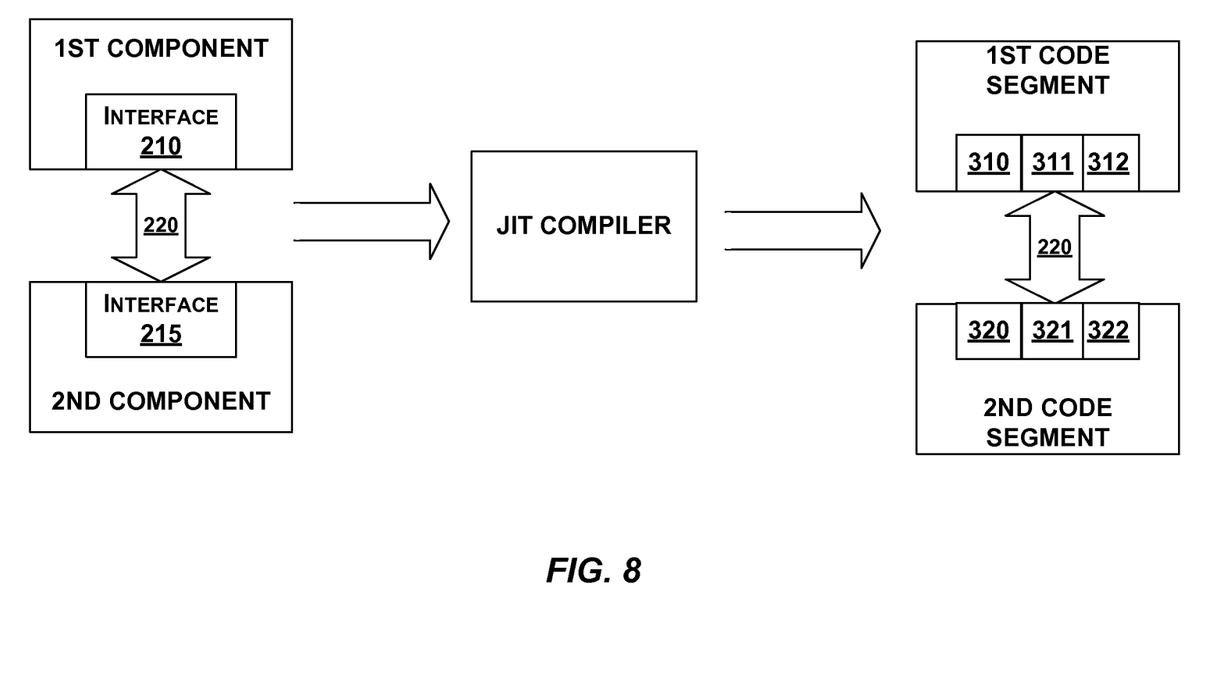

As can be seen in FIG. 7, this approach is similar to the Divorce scenario described above. It might be done, for example, where an installed base of applications are designed to communicate with an operating system in accordance with a first interface protocol, but then the operating system is changed to use a different interface. The JIT Compiler may be used to conform the communications on the fly from the installed-base applications to the new interface of the operating system. As depicted in FIG. 8, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched, and combined to produce the same or equivalent scenarios to the generic scenarios presented in FIGS. 2A and 2B. It is also noted that, as with most programming constructs, there are other similar ways of achieving the same or similar functionality of an interface which may not be described herein, but nonetheless are represented by the spirit and scope of the subject matter described herein, i.e., it is noted that it is at least partly the functionality represented by, and the advantageous results enabled by, an interface that underlie the value of an interface.

Multi-Dimensional Mathematical Formulation

As mentioned previously, current graphics programs rely on mathematical formulations that are specialized to a particular dimension. To operate in another dimension involves using a different mathematical formulation which may involve creating and testing code. Aspects of the subject matter described herein describe a single formulation that can work correctly in any number of dimensions.

The foundational idea in Euclidean N-dimensional space is that of a point or vector. Any such point is uniquely labeled by an ordered collection of N real numbers called rectangular coordinates. Polar coordinates are an alternate way of representing a point. In polar coordinates, a point in N-dimensional space may be uniquely labeled by a single radial distance from the origin and an ordered collection of N−1 polar angles.

Rectangular and polar coordinates are useful in different scenarios. For example, a programmer may use rectangular coordinates to create point data, but use the polar coordinates for the same points for drawing or animation. For example, it may be easier to the programmer to draw a house using rectangular coordinates, but it may be easier to the programmer to rotate the house using polar coordinates.

Figure 9:
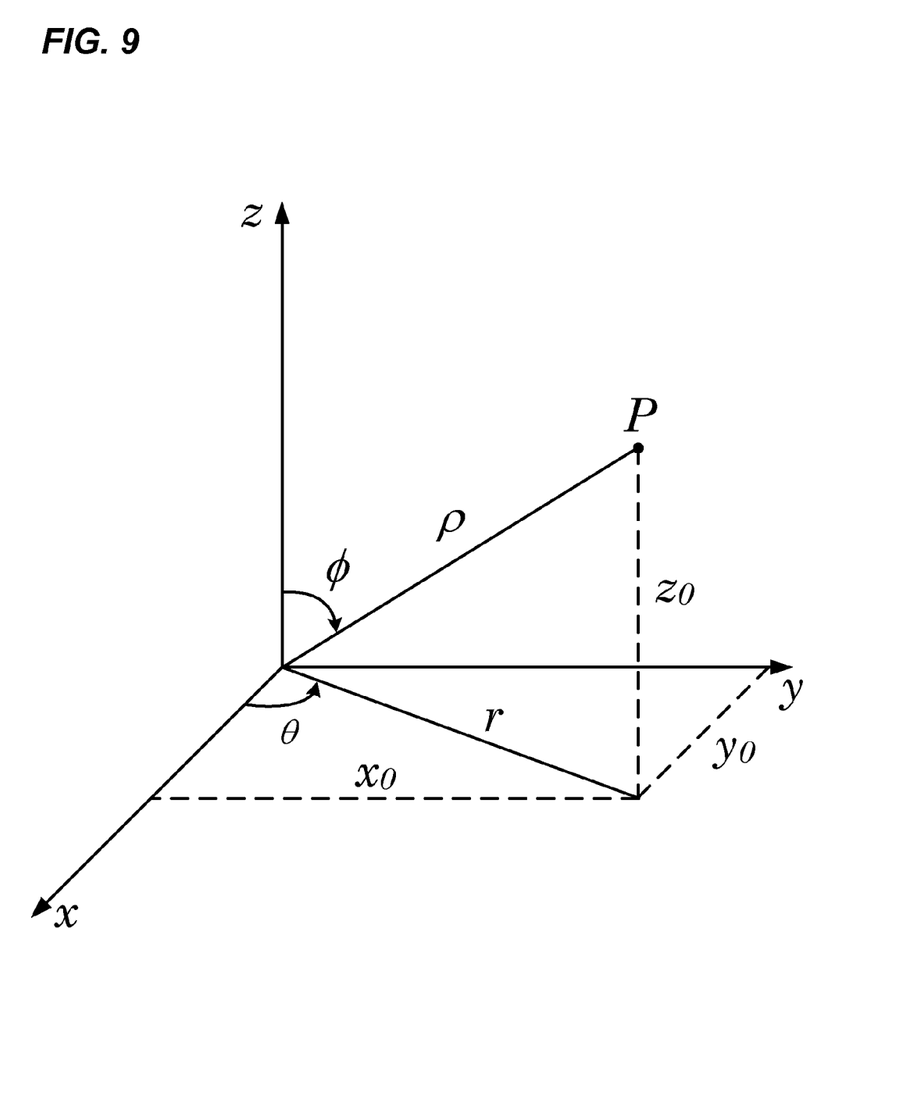
FIG. 9 is a diagram that illustrates a coordinate system and conversions between polar and rectangular coordinates according to aspects of the subject matter described herein.

FIG. 9 is a diagram that illustrates a coordinate system and conversions between polar and rectangular coordinates according to aspects of the subject matter described herein. The coordinate system includes an x axis, a y axis, and a z axis. The rectangular coordinates of any point P in Euclidean 3-space may be represented by $x_0$, $y_0$, and $z_0$, while the polar coordinates of any point in 3-space may be represented by $\rho$, $\theta$, and $\phi$. The zenith angle, $\phi$, is measured from the basis vector of the third dimension, z, towards the supporting two-dimensional plane spanned by x and y. All points on the 2D(x, y) plane, except the origin, have $\phi=\pi/2$. The origin's zenith angle is undefined, strictly speaking, but continuity concerns would argue for an artificial definition of $\pi/2$ there as well.

In computer software implementations, there are at least two problems with current polar representations. First, the zenith angle is not graceful. Second, the zenith angle is not consistent with the polar angle, $\theta$, in two dimensions. Specifically, $\theta$ defaults to zero when the second dimension, y, is ignored. Thus, the three-dimensional definition is not a generalization of the two-dimensional definition, and thus is not a template for further generalization to four and higher dimensions. Both of these problems will be discussed in more detail below.

In general, these two problems may be addressed by redefining the last polar angle as the complement of φ, that is, by measuring upward from the lower-dimensional (x, y) plane toward the vector ρ, in the plane spanned by ρ and z. This change may be generalized to any number of dimensions, with recursive graceful defaults.

Why the Zenith Angle is not Graceful

Modern software platforms often aggressively initialize all data to zero as a prophylaxis against data garbage. In rectangular coordinates, such initialization is exactly what is wanted. For example, a user ignoring the third dimension gets zero for z, as needed. In polar coordinates, however, when ignoring the third dimension and when φ is measured from the z axis, φ needs to be set to π/2 to have calculations done correctly. This turns out to be tricky and error-prone. Furthermore, the usual formula for φ, namely $\tan^{-1}(\text{sqrt}(x^2+y^2)/z)$, mathematically evaluates to π/2 for z=0, but implementations differ and are unreliable.

Why the Zenith Angle is not Consistent

When looking at a two-dimensional (x, y) plane, the polar angle, θ, is measured from the basis vector of the first coordinate, x, to the basis vector of the second coordinate, y. All points on the x axis have a zero value for the second coordinate, y. Whenever the second coordinate, y, is zero, the polar angle, θ, is zero. Someone working in one dimension would not use either y or θ, and modern, aggressive software platforms would default those values to zero. Someone inspecting such one-dimensional data by asking for y and θ would get the correct values, namely zero. Even at the singularity at the origin, where the polar angle is not defined, strictly speaking, zero is an appropriate value in light of continuity concerns.

When looking at a three-dimensional space of (x, y, z) points, all points on the (x, y) plane have a zero value for the third coordinate, z. Whenever the third coordinate, z, is zero, in conventional polar coordinate systems, the second polar angle, φ, is π/2. Because of zero memory initialization by software platforms, this is not a good situation. If the second polar angle were zero when z=0, then there would be a generalization of the two-dimensional definitions. Furthermore, this could generalized for any dimensional space as follows:

In N-dimensional space, for any N≧2, polar coordinates may be defined with N−1 polar angles and one radial distance, such that for all points with the last coordinate zero, the last polar angle is zero. This definition recurses so that if the last two coordinates are zero, then the last two polar angles are also zero, and so on.

Another way of defining this problem is to let P be a point in Euclidean N-space, where N≧2, and let r be the Euclidean distance from P to the origin, namely, the positive solution to $r^2 = x_1^2 + x_2^2 + \ldots + x_N^2$. Then, the task is to find N−1 angles, $\tau_2, \tau_3, \ldots, \tau_N$, such that:

1. $x_{N-M+1}, x_{N-M+2}, \ldots, x_N$ are zero if and only if the top M angles are zero; and
2. Match the conventional two-dimensional polar coordinates and the three-dimensional Euler angle with the last polar angle redefined as the complement, π/2−φ.

Note that the phrase "if and only if" as used herein is used in the mathematical sense. It means that if the condition on the right of the phrase is true, that the condition on the left of the phrase is also true. It also means that if the condition on the left of the phrase is true, that the condition on the right of the phrase is true.

Two is the lowest dimensionality with conventional polar coordinates. It is possible, although perhaps not too useful, to extend the scheme to one dimension by defining the "polar angle" in one dimension as the algebraic sign of the x coordinate.

A Coordinate Conversion Formulation That Works in N>1 Dimensions

Figure 10:
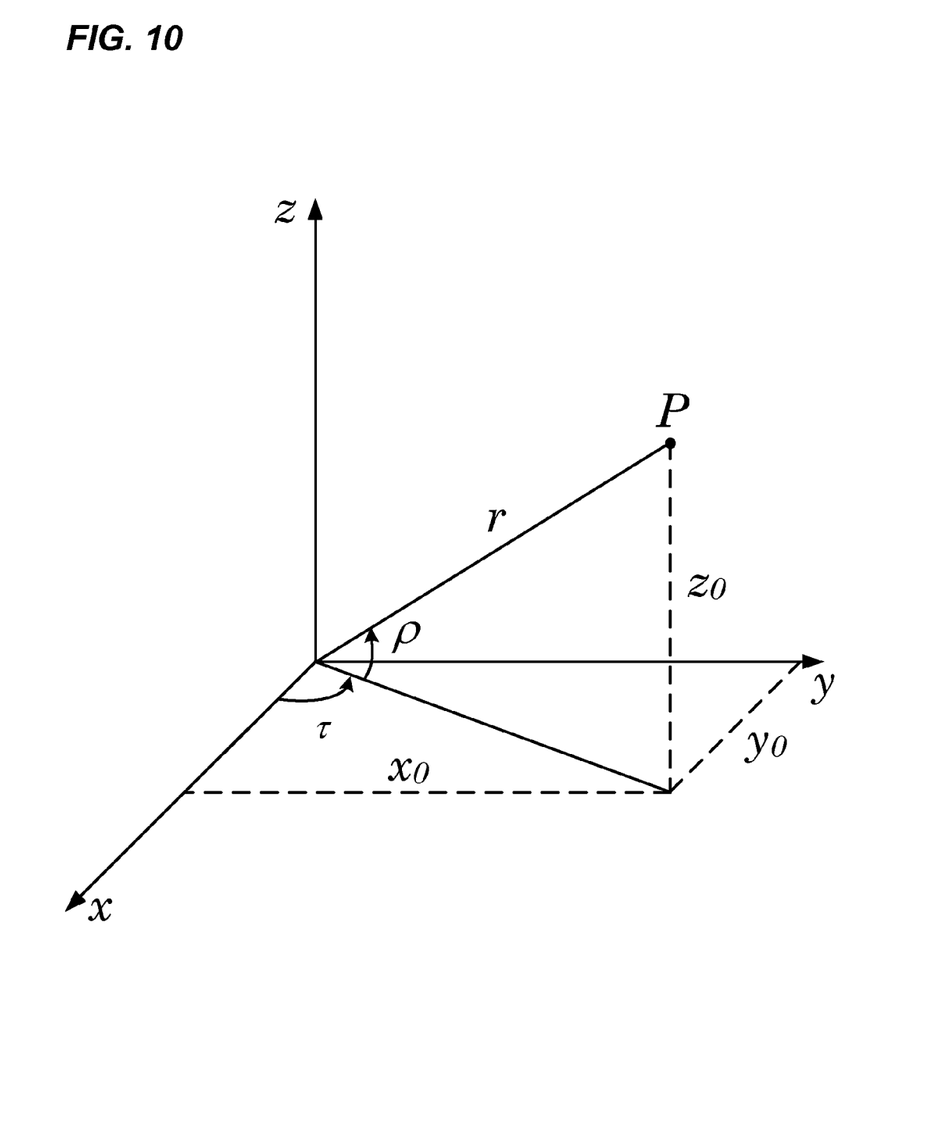
FIG. 10 is a diagram that illustrates another coordinate system showing polar and rectangular coordinates where the last polar angle is measured from the x-y plane according to aspects of the subject matter described herein.

FIG. 10 is a diagram that illustrates another coordinate system showing polar and rectangular coordinates where the last polar angle is measured from the x-y plane according to aspects of the subject matter described herein. Although the coordinate system is a right-handed coordinate system, the concepts described herein may also apply to or be used to transform coordinates in left-handed coordinate systems.

Referring to FIG. 10, let the last rectangular coordinate (z) of the point P be the sine-projection of the 3D radial vector (r) by the last polar angle (ρ), measured upward from the 2D plane to the 3D radial vector. In other words, z=r sin(ρ). It can be seen that the last polar angle, ρ, is zero if and only if the last rectangular coordinate is zero.

The projection of the 3D radial vector onto the 2D plane is the cosine-projection by the last polar angle, ρ. This projection is referred to herein as the 2D residual radial vector. Recursively, the next-to-last rectangular coordinate of the 3D radial vector is the sine-projection of the 2D residual radial vector by the next-to-last angle, τ. This may be written as y=r sin(τ)cos(ρ). In three dimensions, the next-to-last polar angle also happens to be the first polar angle.

Finally, the last rectangular component of the 3D radial vector is the accumulated cosine-projections of all the polar angles, which may be written as x=r cos(τ)cos(ρ). Collecting the conversions from polar to rectangular coordinates in three dimensions, the following is obtained:

$$x = r \cos(\tau)\cos(\rho) \qquad 1$$

$$y = r \sin(\tau)\cos(\rho) \qquad 2$$

$$z = r \sin(\rho) \qquad 3$$

Notice that when ρ=0, x=r cos(τ), y=r sin(τ), and z=0, and that the formulation simplifies to the two-dimensional formulation. This is exactly what is desired as when the last coordinate (z) is zero, it is desired to have the last angle (ρ) be zero and vice versa.

In four dimensions, let the last rectangular coordinate (w) be the sine-projection of the 4D radial vector (r) by the last polar angle (α) measured upward from the 3D hyperplane to the 4D radial vector. This may be written as w=r sin(α). Note that w is zero if and only if α is zero.

The projection of the 4D radial vector onto the 3D hyperplane is the cosine-projection by the last polar angle, α. This projection is hereinafter called the 3D residual radial vector. Recursively, the next-to-last rectangular coordinate of the 4D radial vector is the sine-projection of the 3D residual radial vector by the next-to-last polar angle, here called ρ. Then, the 3D residual radial vector may be written as z=r sin [ρ] cos [α].

At this point, the formulation has recursed down to two dimensions, and the other coordinates (x, y) may be expressed exactly as expressed in dimension three but with an extra cos(α) multiplied at the end. Collecting the conversions from polar to rectangular coordinates in four dimensions, yields the following.

$$x = r \cos(\tau)\cos(\rho)\cos(\alpha) \qquad 1$$

$$y = r \sin(\tau)\cos(\rho)\cos(\alpha) \qquad 2$$

$$z = r \sin(\rho)\cos(\alpha) \qquad 3$$

$$w = r \sin(\alpha) \qquad 4$$

Notice that when $\alpha=0$, $x=r\cos(\tau)\cos(\rho)$, $y=r\sin(\tau)\cos(\rho)$, and $z=r\sin(\rho)$ and that the formulation simplifies to the three-dimensional formulation.

This pattern can be generalized to any number of dimensions. More specifically, in N dimensions, N>1, if the radial distance r is equal to the positive solution of $r^2=x_1^2+x_2^2+\ldots+x_N^2$, the polar angles are $\tau_2, \tau_3, \ldots, \tau_N$ (where $\tau_i$ is the polar angle that is measured upward from the (i−1) dimensional axis, plane, or hyperplane as the case may be), and the coordinates are $x_1, x_2, \ldots, x_N$, the coordinates for $x_i$ may be expressed as:

For $x_1$:      1.
$$x_1 = r \cdot \prod_{j=2}^{N} \cos(\tau_j)$$

For $x_i$, $i > 1$:      2.
$$x_i = r \cdot \sin(\tau_i) \cdot \prod_{j=i+1}^{N} \cos(\tau_j)$$

Note that the above formulations have the desired results of causing the last polar angles to be zero if and only if the corresponding $x_i$s are also zero. This works well in software platforms that initialize memory to zero since if a dimension is ignored (and initialized to zero), the corresponding polar or rectangular coordinate corresponding to that dimension is set to zero.

A related issue with respect to coordinate conversion relates to arctangent, which may be used to obtain a polar angle. The standard evaluation of arctangent creates several complicated issues. The programmer forming the ratio sqrt$(x^2+y^2)/z$ is responsible for handling the special case when z=0. A software platform may throw exceptions or return error on division by zero, virtually never supports infinite values, let alone as input arguments to the arctangent function, and has troubles returning the correct value of $\pi/2$. So the programmer is responsible for supplying mathematically appropriate special-case code, which opens a broad opportunity for bugs.

A software platform may supply a quadrant-sensitive, binary arctangent function to address the divide-by-zero problem, but implementations may get the arguments backwards, return 0 instead of $\pi/2$ when either argument is zero or both arguments are zero, or have other issues. In other words, these binary arctangent functions are often not reliable, and to ensure correct operation, a programmer may be required to code defensively and test the platform functions aggressively. This opens opportunities for bugs and creates wasteful work.

To convert from rectangular coordinates to polar coordinates, square root and arctangent functions may be used. For example, in two dimensions, let r and $\theta$ be polar coordinates with domains $0 \leq r$ and $0 \leq \theta < 2\pi$. The rectangular coordinates are $x=r\cos\theta$, $y=r\sin\theta$ and range over all of $R^2$. These formulas represent a surjective mapping from $\{0 \leq r, 0 \leq \theta < 2\pi\}$ onto $R^2$. To invert this mapping, let $r=+\text{sqrt}(x^2+y^2)$ and $\theta=$ $x>0, y\geq 0: \tan^{-1}(y/x)$      1

$x>0, y<0: \tan^{-1}(y/x)+2\pi$      2

$x<0: \tan^{-1}(y/x)+\pi$      3

$x=0: 0$      4

This definition for arctan (hereinafter called A Tan 2) yields only positive values for the angle. Although it is not required, mathematically, to have only positive values for these angles, it may be more helpful for programmers to think of positive values when dealing with polar coordinates. Note that in two dimensions if y=0, then $\theta=0$, and r=x, which is exactly what is desired.

In general, to obtain the polar angle, $\tau_i$, for any rectangular coordinate, let $r=+\text{sqrt}(x_1^2+x_2^2+\ldots+x_N^2)$, where $x_1^2+x_2^2+\ldots+x_N^2$ are the rectangular coordinates in N-dimensional space. Let the last polar coordinate be $\tau_N$=A Tan 2 $(x_N, \text{sqrt}(x_1^2+x_2^2+\ldots+x_{N-1}^2))$. As can been seen by inspection, $\tau_N$ will be zero if any only if $x_N$ is zero, except perhaps at the origin, where continuity concerns support an artificial definition of zero. Recursing, let $\tau_{N-1}$=A Tan $2(x_{N-1}, \text{sqrt}(x_1^2+x_2^2+\ldots+x_{N-1}^2))$, and so on until reaching the first angle $\tau_2$=A Tan 2 $(x_2/x_1)$. This formulation satisfies the goals set out above, namely, that the lower-dimensional representations are consistently embedded in the higher-dimensional representations and that higher polar angles default to zero when higher rectangular components vanish.

A software interface may be constructed as described in conjunction with FIGS. 2-8 that receives input parameters in one or more dimensions of one coordinate system and provides output parameters in another coordinate system. The interface may be configured such that the parameters may be passed in and out in a variety of orders without departing from the spirit or scope of aspects of the subject matter described herein.

Furthermore, the interface may be constructed to work in multiple dimensions. Parameters that are not supplied may be assumed to be zero. In one embodiment, the dimensions of the space in which conversion is requested may be inferred by the number of input parameters. For example, if only two parameters are given, it may be inferred that a two-dimensional conversion is taking place.

In one embodiment, the parameters (both input and output) may be of any arbitrary precision including integer, float, double, long double, and so forth. In another embodiment, the parameters may be complex, which may include imaginary numbers. In practice, the parameters may be of any type for which multiple-dimensional analysis makes sense.

In one embodiment, the interface may be arranged to return values having the same type and precision as the input parameters. An interface with type checking may be constructed via constructs known as "generics" in Ada, Eiffel, Java, C#, "templates" in C++, or similar mechanisms in other languages. The generics or templates may be instantiated to a particular type.

In some embodiments, an intermediate interface may be used to convert from the Euler angle to the polar angles defined herein and back again. Such an interface may be used to create compatibility with programs that are coded to work with the Euler angle, for example.

Partial evaluation may be used to improve performance when working in a dimension less than allowed by a library. In partial evaluation, code may be rewritten dynamically by a run-time environment or statically by a compiler to take advantage of known features (such as certain expressions evaluating to a constant such as zero or one). Instead of brute-force multiplying everything by a zero or one, the code may be rewritten to skip the multiplying steps. In this way, a library originally written to work with N dimensions may be rewritten by the compiler or on-the-fly by a run-time environment to work with M dimensions, M<N, such that the rewritten code is optimized for the M dimensions. Depending on the compiler or run-time environment, the rewritten code may be as efficient as if hand-coded by a programmer.

Figure 11:
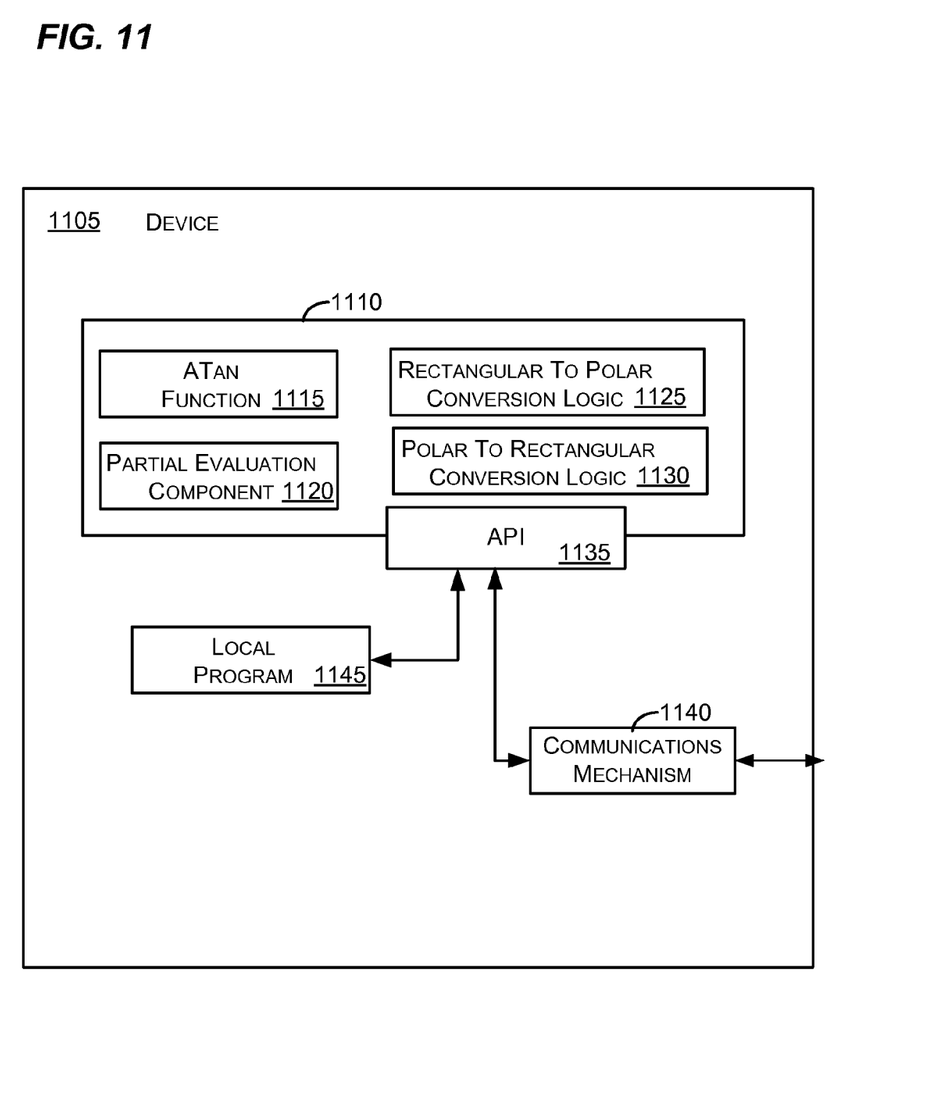
FIG. 11 is a block diagram that represents an exemplary device configured to operate in accordance with aspects of the subject matter described herein.

FIG. 11 is a block diagram that represents an exemplary device configured to operate in accordance with aspects of the subject matter described herein. Although the device is shown having certain components, it will be recognized that other variations of the device may be implemented without departing from the spirit or scope of aspects of the subject matter described herein. Furthermore, components described in conjunction the device may be combined and/or further subdivided in other embodiments. The components may be placed in other components (not shown) or may include other components (not shown). In addition, it will be recognized that more, fewer, or other components may exist on the device without departing from the spirit or scope of aspects of the subject matter described herein.

In some embodiments, the device 1105 may include a library 1110, a local program 1145, and a communications mechanism 1140. The component library 1010 may include an arctangent function 1115, a partial evaluation component 1120, rectangular to polar conversion logic 1125, and polar to rectangular conversion logic 1130. The library 1110 may be accessed via an interface 1135.

The communications mechanism 1140 allows the device 1105 to communicate with other devices to provide information to and from the API 1135. The communications mechanism 1140 may be a network interface or adapter 170, modem 172, or any other mechanism for establishing communications as described in conjunction with FIG. 1.

The local program 1145 represents any process, thread, task, or the like that executes on the device 1105 whether in user mode, kernel mode, or otherwise. The local program 1145 may interface with the library 1110 via the interface 1135.

The interface 1135 provides a mechanism for interfacing with functionality provided by the library 1110. A local or remote process may call the interface 1135. Exemplary interfaces suitable for the interface 1135 are described above in conjunction with FIGS. 2A-8. Parameters provided to the interface 1135 may include one or more polar or rectangular coordinates.

The arctangent function 1115 receives two values and returns a positive angle as described above in conjunction with the A Tan 2 function above.

The partial evaluation component 1120 may dynamically and/or statically rewrite code to make it more efficient as described in conjunction with FIG. 10.

The rectangular-to-polar conversion logic 1125 includes logic for converting rectangular coordinates to polar coordinates as previously described. Similarly, the polar-to-rectangular conversion logic 1130 includes logic for converting polar coordinates to rectangular coordinates as previously described.

Figure 12:
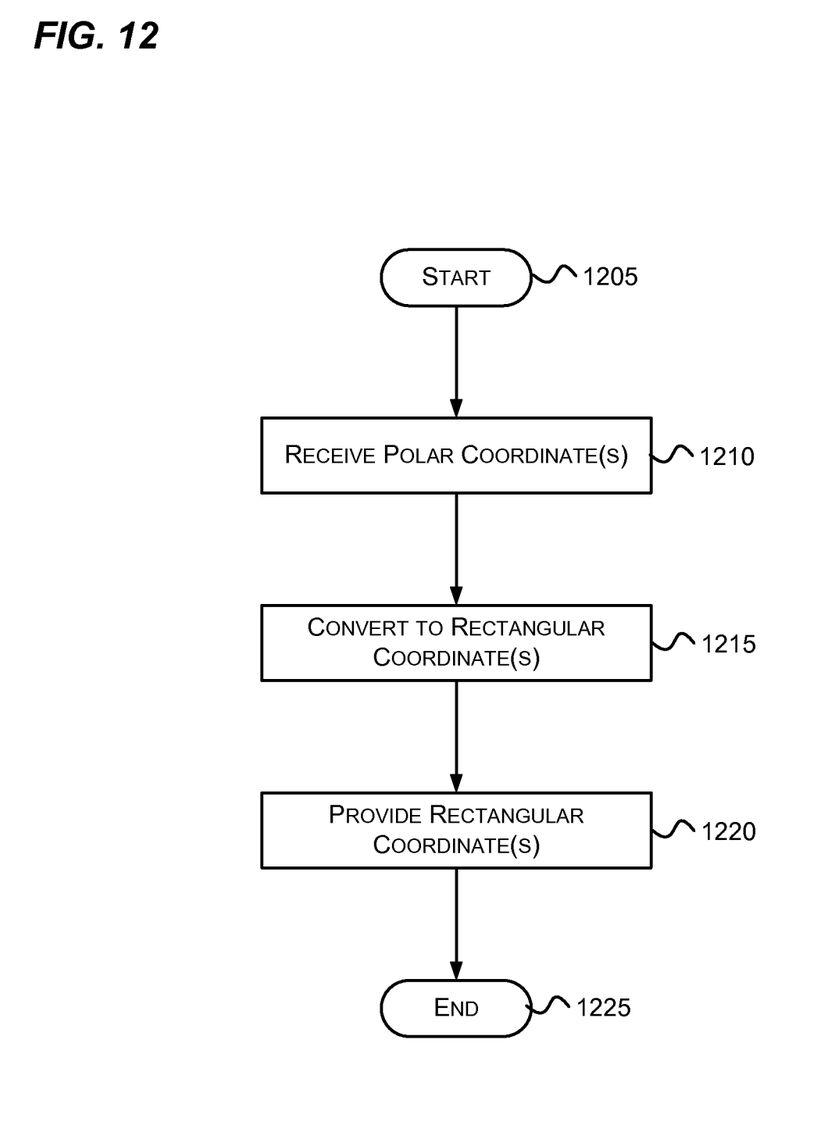
FIG. 12 is a flow diagram that generally represents actions that may occur in converting from polar to rectangular coordinates in accordance with aspects of the subject matter described herein.
Figure 13:
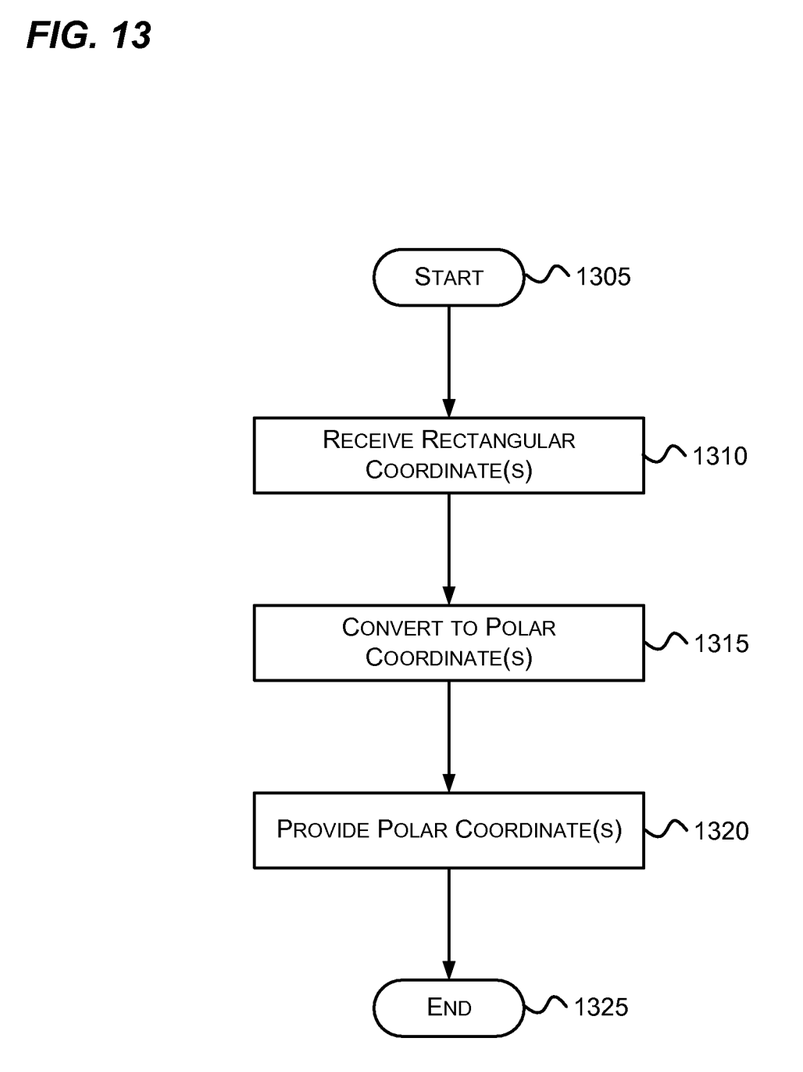
FIG. 13 is a flow diagram that generally represents actions that may occur in converting from rectangular to polar coordinates in accordance with aspects of the subject matter described herein.

FIGS. 12-13 are flow diagrams that generally represent exemplary actions that may occur in accordance with aspects of the subject matter described herein. For simplicity of explanation, the methodology described in conjunction with FIGS. 12-13 are depicted and described as a series of acts. It is to be understood and appreciated that the aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methods in accordance with aspects of the subject matter described herein. In addition, those skilled in the art will understand and appreciate that the methods could alternatively be represented as a series of interrelated states via a state diagram or as events.

FIG. 12 is a flow diagram that generally represents actions that may occur in converting from polar to rectangular coordinates in accordance with aspects of the subject matter described herein. At block 1205, the actions begin.

At block 1210, one or more polar coordinates are received. For example, referring to FIG. 11, polar coordinates are received at the interface 1135.

At block 1215, the coordinate(s) are converted into rectangular coordinate(s). For example, referring to FIG. 11, the polar-to-rectangular conversion logic 1130 is employed to convert the coordinate(s).

At block 1220, the converted coordinate(s) are provided. For example, referring to FIG. 11, the interface 1135 provides the coordinate(s) to the calling process.

At block 1225, the actions end.

FIG. 13 is a flow diagram that generally represents actions that may occur in converting from rectangular to polar coordinates in accordance with aspects of the subject matter described herein. At block 1305, the actions begin.

At block 1310, one or more rectangular coordinates are received. For example, referring to FIG. 11, rectangular coordinates are received at the interface 1135.

At block 1315, the rectangular coordinate(s) are converted into polar coordinate(s). For example, referring to FIG. 11, the rectangular-to-polar conversion logic 1125 is employed to convert the coordinate(s). The rectangular-to-polar conversion logic 1125 may employ the arctangent function 1115 to obtain angles.

At block 1320, the converted coordinate(s) are provided. For example, referring to FIG. 11, the interface 1135 provides the coordinate(s) to the calling process.

At block 1325, the actions end.

As can be seen from the foregoing detailed description, aspects have been described related to accessing content. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer comprising at least one processing unit, the method comprising:

receiving at a user input interface of the computer, an angle of an N-dimensional polar representation of a point, the N-dimensional polar representation having one distance component and N−1 angle components, the angle being a last angle component of the N−1 angle components and corresponding to an $N^{th}$ rectangular coordinate of a rectangular representation of the point, N being greater than two;

calculating, by the at least one processing unit, the $N^{th}$ rectangular coordinate of the rectangular representation of the point by at least causing the angle to be operated on by a sine function that returns a value, wherein the angle is zero if and only if the $N^{th}$ rectangular coordinate of the rectangular representation of the point is zero; and providing the $N^{th}$ rectangular coordinate of the point to a display interface of the computer.

2. The method of claim 1, wherein the angle is subtracted from an angle corresponding to π/2.

3. The method of claim 1, wherein the angle corresponds to an angle between a plane and a radial vector.

4. The method of claim 3, wherein the plane comprises a hyperplane.

5. The method of claim 3, wherein the plane comprises a two-dimensional plane.

6. At least one computer memory storing instructions which when executed by a computer, perform actions, comprising:

at an interface of the computer, receiving an angle partially defining a point in a polar coordinate system that has N dimensions, N>2, the N-dimensional polar coordinate system definable by N−1 polar angles and one radial distance, the angle being a last polar angle of the N −1 polar angles and corresponding to an $N^{th}$ rectangular coordinate of a rectangular representation of the point; and providing, at the interface of the computer, the $N^{th}$ rectangular coordinate corresponding to the angle, the angle being zero if and only if the $N^{th}$ rectangular coordinate of the rectangular representation of the point is zero.

7. The at least one computer memory of claim 6, wherein providing, at the interface of the computer, the $N^{th}$ rectangular coordinate corresponding to the angle comprises calculating the $N^{th}$ rectangular coordinate based at least in part on the angle.

8. The at least one computer memory of claim 7, wherein calculating the $N^{th}$ rectangular coordinate based at least in part on the angle comprises performing a sine operation on the angle to obtain a first value and multiplying the first value by a second value.

9. The at least one computer memory of claim 8, further storing instructions which when executed by the computer cause the computer to perform actions comprising calculating a rectangular coordinate other than the $N^{th}$ rectangular coordinate based at least in part on a product of the radial distance and one or more cosines of other angles defining the point.

10. The at least one computer memory of claim 7, further storing instructions which when executed by the computer cause the computer to perform actions comprising applying partial evaluation to dynamically rewrite code used in calculating the $N^{th}$ rectangular coordinate at least in part based on the angle.

11. The at least one computer memory of claim 7, further storing instructions which when executed by the computer cause the computer to perform actions comprising calculating $$x_i = r \cdot \sin(\tau_i) \cdot \prod_{j=i+1}^{N} \cos(\tau_j)$$

wherein $x_i$, corresponds to the $i^{th}$ rectangular coordinate, i corresponds to a dimension of a rectangular coordinate system including the $i^{th}$ rectangular coordinate, r corresponds to a radial distance from an origin of the polar coordinate system to the point, $\tau_i$, corresponds to the angle, and $\tau_{j<>i}$ corresponds to other polar angles that assist in defining the point.

12. The at least one computer memory of claim 6, wherein the angle is a real value.

13. The at least one computer memory of claim 6, wherein the angle is a complex value.

14. The at least one computer memory of claim 6, wherein the angle and the coordinate are of one type.

15. In a computing environment, an apparatus, comprising:
an interface receiving a first value corresponding to a first coordinate system and returning a second value in a second coordinate system, one of the coordinate systems being an N-dimensional polar coordinate system, the N-dimensional polar coordinate system definable by N−1 polar angles and one radial distance, the angle being a last polar angle of the N−1 polar angles and corresponding to an $N^{th}$ rectangular coordinate of a rectangular representation of the point, the angle being zero if and only if the $N^{th}$ rectangular coordinate of the rectangular representation of the point is zero; and conversion logic to compute the second value using the first value.

16. The apparatus of claim 15, wherein the conversion logic comprises a partial evaluation component that rewrites the conversion logic to reduce computation by using known features.

17. The apparatus of claim 15, wherein the conversion logic to compute the second value using the first value includes an arctangent function that returns positive values only.

18. The apparatus of claim 15, wherein the conversion logic comprises one or more of polar to rectangular and rectangular to polar conversion logic.

19. The apparatus of claim 15, wherein the conversion logic to compute the second value using the first value includes a square root function.

20. The apparatus of claim 15, wherein the conversion logic to compute the second value using the first value comprises performing a sine operation on the angle to obtain an intermediate result and multiplying the intermediate result by the radial distance.

* * * * *